United States Patent [19]

Kaplan et al.

[11] 4,030,102

[45] June 14, 1977

[54] DEPLOYABLE REFLECTOR STRUCTURE

[75] Inventors: Richard Kaplan, East Meadow; Jack L. Schultz, Huntington, both of N.Y.

[73] Assignee: Grumman Aerospace Corporation, Bethpage, N.Y.

[22] Filed: Oct. 23, 1975

[21] Appl. No.: 625,210

[52] U.S. Cl. .......................... 343/915; 343/DIG. 2; 350/289
[51] Int. Cl.² ...................................... H01Q 15/20
[58] Field of Search ............ 343/DIG. 2, 881, 882, 343/915; 350/288, 289

[56] References Cited
UNITED STATES PATENTS

| | | | |
|---|---|---|---|
| 3,077,599 | 2/1963 | Mitchum et al. | 343/705 |
| 3,179,211 | 4/1965 | Dunlavy | 343/882 |
| 3,576,566 | 4/1971 | Cover et al. | 343/915 |
| 3,635,547 | 1/1972 | Rushing et al. | 343/915 |

*Primary Examiner*—Eli Lieberman
*Attorney, Agent, or Firm*—Richard G. Geib; Mellor A. Gill

[57] ABSTRACT

A supporting structure that deployed resembles a spoked wheel which is retractable into a compact volume by virtue of hinged rim and reelable spokes that is an efficient and stable structure for storing, deploying and supporting surfaces such as radar and communications antennas, shielding, earth sensing, solar cell arrays and solar energy reflectors.

10 Claims, 12 Drawing Figures

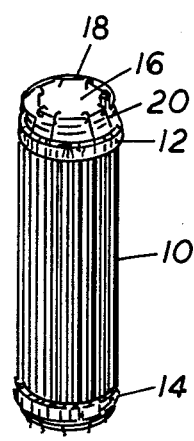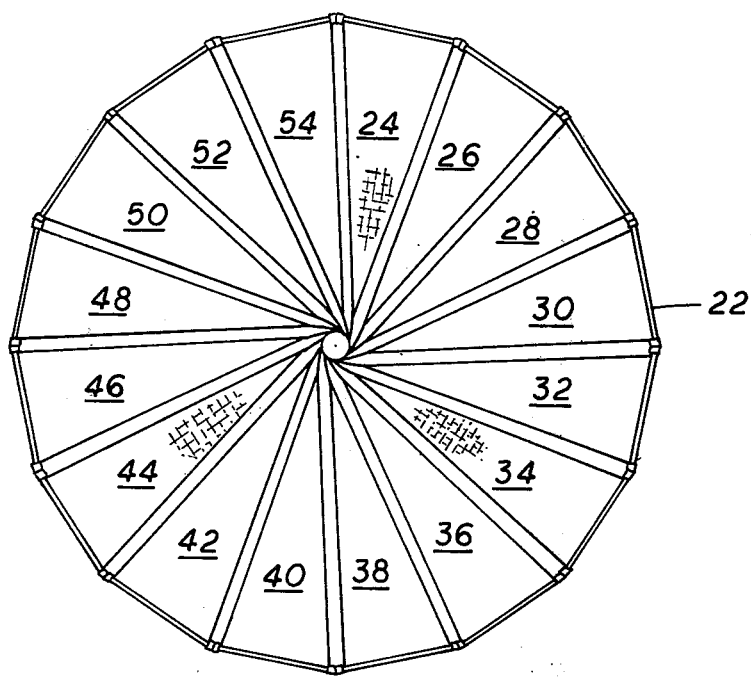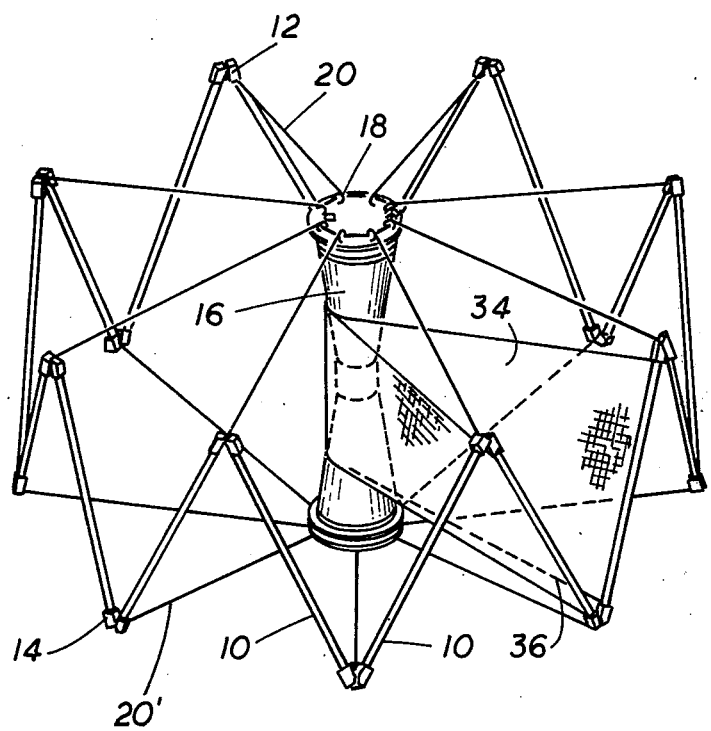

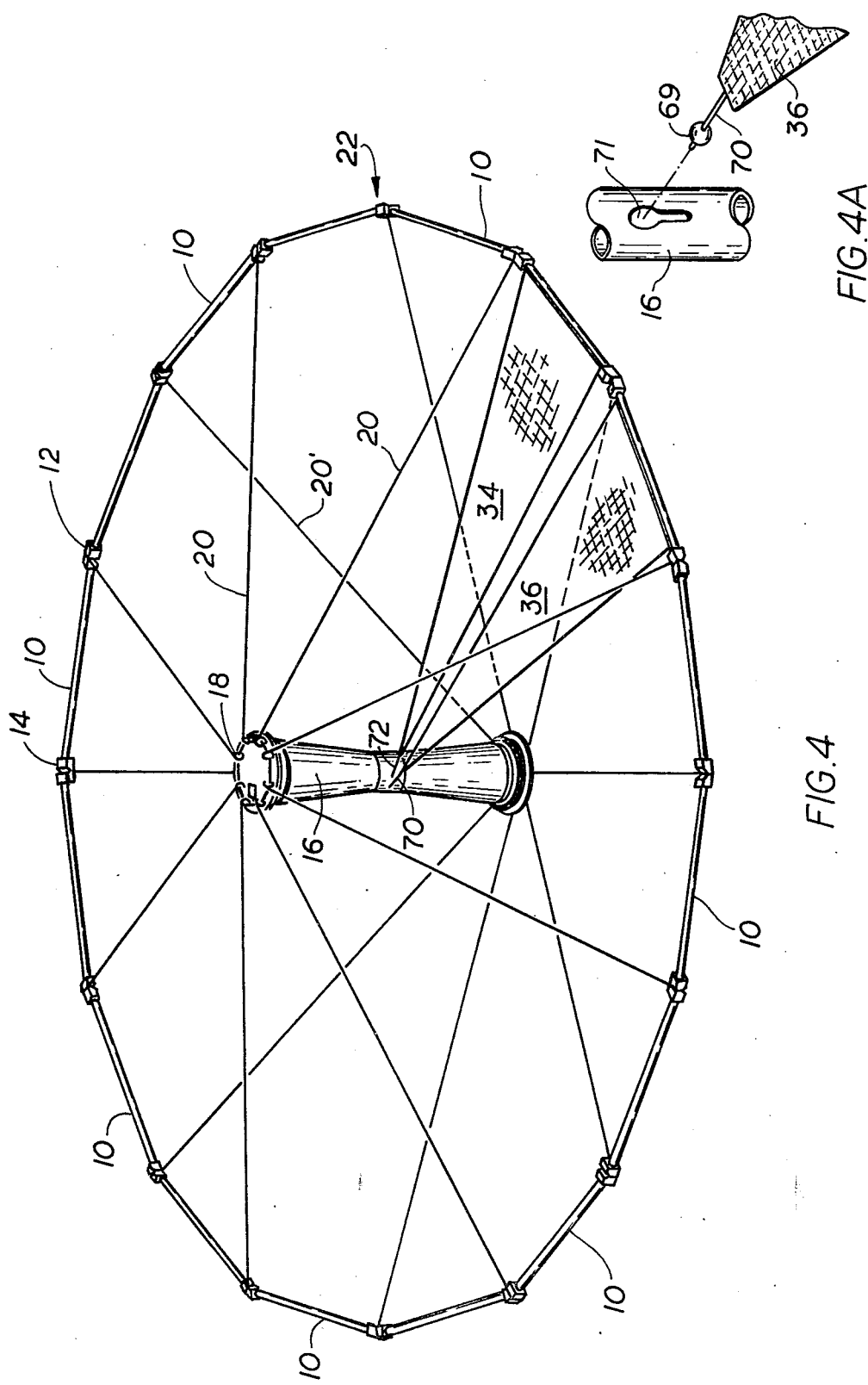

DEPLOYABLE REFLECTOR STRUCTURE

BACKGROUND

Various space systems demand energy collectors and transmitters, reflectors, radio antennas, and radiant energy sensors having large surface areas. Transportation from earth to space requires that these surfaces be deployable from a small size when launched to a large size in space. It is for the purpose of efficiently packaging, deploying, and structurally supporting such surfaces that this invention is particularly concerned.

Previous patented attempts at such structures were noted from U.S. Pat. Nos. 3,508,270; 3,521,290; 3,576,566; 3,605,197 and 3,729,743. In addition, another patent of particular interest to this disclosure is U.S. Pat. No. 3,617,113 showing a deployable structure for the supporting of an antenna reflector using a ring made up from a plurality panels hinged to wedge structures for extending a plurality of vertical panels to form a cylinder by which the reflector is supported and within which the reflector is randomly bunched up before deployment. It is in the improvement of the structure such as shown by U.S. Pat. No. 3,617,113 that this invention is concerned. Specifically this invention eliminates the need for a heavy structure such as in the U.S. Pat. 3,617,113 patent and enables use of other than highly distortable single surfaces.

More particularly, it is a principal object of this invention to provide a deployable support which may be made of the extremely lightweight tubular structure and located normal to a central hub by lightweight spokes much as one would suspend the rim from the hub of a spoked wheel.

A more particular object of this invention is to present a structural arrangement of a segmented and hinged rim supported by spokes joined to a common hub so that the rim can be more compactly packaged than is possible by prior art standards while being better capable of achieving larger deployed size than possible with the prior art without bunching with consequent wrinkling and deterioration of payload surfaces such as reflector material.

A more particular object of this invention is to provide a rigid, non-spinning deployable structure composed of a foldable rim having an even number of segments hinged by means of practicing this invention to be foldable about a common hub from which radial tension spokes structurally stablize the rim in the deployed configuration.

A still further object of this invention is to provide a means to deploy a circular antenna reflector or solar collector, etc., by a plurality of articulated rim segments that are caused to deploy from a stowed position while unrolling gore panels and tension spoke means from a central hub.

It is also a still further object of this invention to provide means on the hub of a deploying structure to insure alignment thereon of deployable panels.

Still further is an object of this invention to control the rate of deployment of articulated rim segments by controlling the rate of deployment of spoke means connected to said articulated rim segments during deployment.

SUMMARY

In summary this invention relates to a large, lightweight structure which when deployed resembles a spoked wheel providing a thick, stable support adaptable for payload surfaces such as are required for multiple layer planar arrays, or single layer spherical or parabolic reflectors for radar and communication antennas, shielding, earth sensing, solar cell arrays and solar energy reflectors. The invention is operative by virtue of a multiplicity of hinged rim and reelable spokes capable of deploying payload surfaces that can be wrapped around and supported on a central support drum (hub) to form a simple compact cylindrical package structurally suitable for space launch boosters. When deployed the structure is such that it has the capability to accommodate the small accelerations experienced in orbit. In deploying the structure this invention permits the use of stored energy in the form of springs (or electrical motors) and matched gears at the rim joints to ensure the required uniform angular and radial deployment of the rim members and their attached payload surface elements which unwrap from the drum. Also, metered deployment of rim and surface elements is provided pursuant to the invention by tension controlled release of the wrapped stays from drum mounted electrical motor driven stay reels.

DRAWING DESCRIPTION

FIG. 1 is an isometric view of an undeployed (stowed for launch) structure in accordance with this invention;

FIG. 2 is an isometric view of the structure of this invention at it is being deployed with only two panels shown as drawn from the hub for viewing simplicity;

FIG. 3 is a plan view through the center horizontal plane of the hub showing the fully deployed rim and panels (gore elements) therebetween;

FIG. 4 is an isometric view of the fully deployed structure with again only two gore panels shown again for viewing simplicity;

FIG. 4A is a isometric view of an end connection of gore to hub;

DETAIL DESCRIPTION

Figure 5:
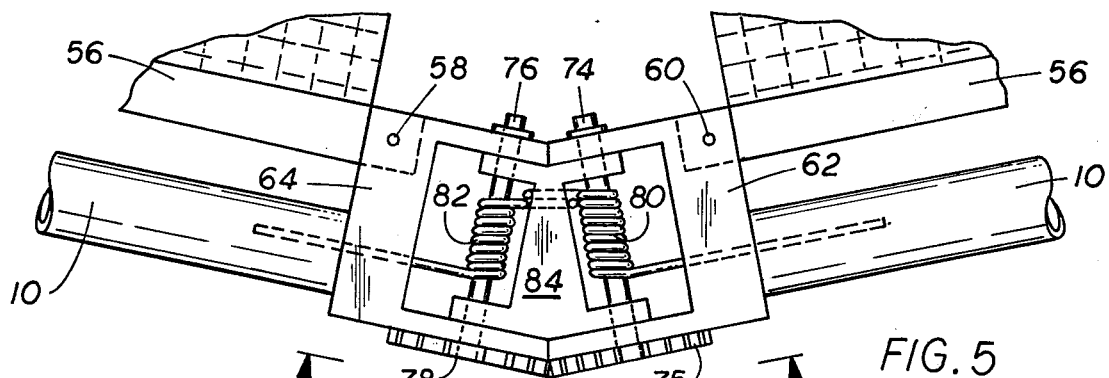
FIG. 5 is a plan view of a portion of the rim showing the articulation of two rim segments.

With specific reference to the drawings there is shown a structure of equal length tubular members 10 (rim segments) connected together at their upper ends by intermediate blocks 12 and at their lower ends by intermediate blocks 14. A central hub 16 is provided with upper and lower reels 18 within which wires, cables or thin tapes 20 are wound. These reels can be designed such that the wires, etc when extended will create a return force to rewind the wires, etc when stowing the tubular members, or as powered reels to provide a bias and return force. The creation of this bias or return torque also controls the deployment of the tubular member 10, by their intermediate blocks 21 in that it (the winding of reels 18) will insure synchronized spreading from the stowed to the deployed attitude shown by FIG. 1, whereat the substantially circular rim formed by the tubes and blocks lies in a plane intermediate and normal to the axes of hub 16. As seen in comparing the various illustrations of FIGS. 1, 2, 3 and 4, the tubes 10 by being articulated at each of their ends to respective blocks 12 and 14 deploy by one end moving down while the other end moves up. In the deployed attitude wires, etc 20 function as spokes would for a wheel, i.e., they act in pairs as a truss to stabilize the rim 22 in either axial or radial direction relative to the axes of tube 16 which also is a major part of the truss in resisting compressive forces. Actually the hub 16 for the rim 22 has a large influence on the truss stiffness. It has been found that the stiffness of the wires against deflection in the direction parallel to the axis of hub 16 increases greatly as the length of hub 16 increases. Also, in that the forces in the spokes is limited to tension, very light wires, cables and thin tapes may be employed as the tension spokes.

With further reference to FIG. 3 there is shown a plurality of antenna gores 24, 26, 28, 30, 32, 34, 36, 38, 40, 42, 44, 46, 48, 50, 52 and 54 (flexible panels). In FIGS. 2 and 4 only panels 34 and 36 are shown so as to better illustrate the apparatus of this invention. Each panel is provided with a plate end 56 (See FIG. 5) attached by pins 58 and 60 (rivets, screws, bolts, etc.) to right and left portions 62 and 64 of blocks 12 or similar portions 66 and 68 of block 14 (See FIGS. 7 and 8). Also the gores are attached by leads, see leads 70 and 72 of FIG. 4, to the central portion of hub 16 in the plane of rim 22. In FIG. 4A there is shown a spherical connector 69 operative in slot 71 of hub (drum) 16 to permit rotation of panel 36 as it rolls on and unrolls from the hub.

With more particular reference to FIG. 5 there is shown one method of hinging rim segments 10 to block 12. As seen therein, tubes 10 affixed in portions 62 and 64 are hinged by pins 74 and 76. It is important that these hinge axes lie in a plane normal to the axis of hub 16. Tubes 10 have gear sectors 75 and 78 that mate so that tubes 10 move synchronously in a radial direction from the hub axis, i.e., each tube 10 rotates the its own midlength while translating outwardly. Thus, the rim is deployed by applying torques, as by springs 80 and 82 at the hinges, to cause synchronized spreading of all the vertically separated joints. Springs 80 and 82 are assembled between bracket 84 and tubes 10 about pins 74 and 76.

In this method the torque is applied by preloaded torsion springs at the hinges to meter the wires outward. However, a motorized approach as will be explained later with reference to FIG. 11 has the obvious advantage of both deploying and stowing without using reels to do more than control spoke deployment and winding.

Figure 6:
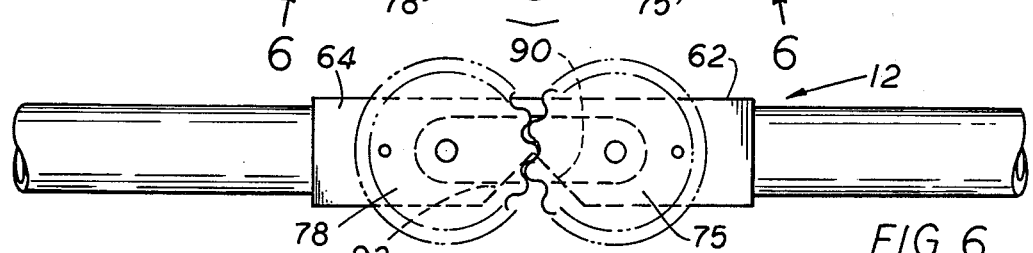
FIG. 6 is a view along lines 6—6 of FIG. 5.
Figure 7:
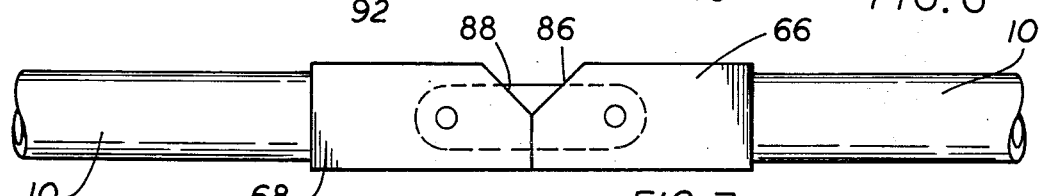
FIG. 7 is a side view similar to FIG. 6 but of the next adjacent articulation of rim segments.
Figure 8:
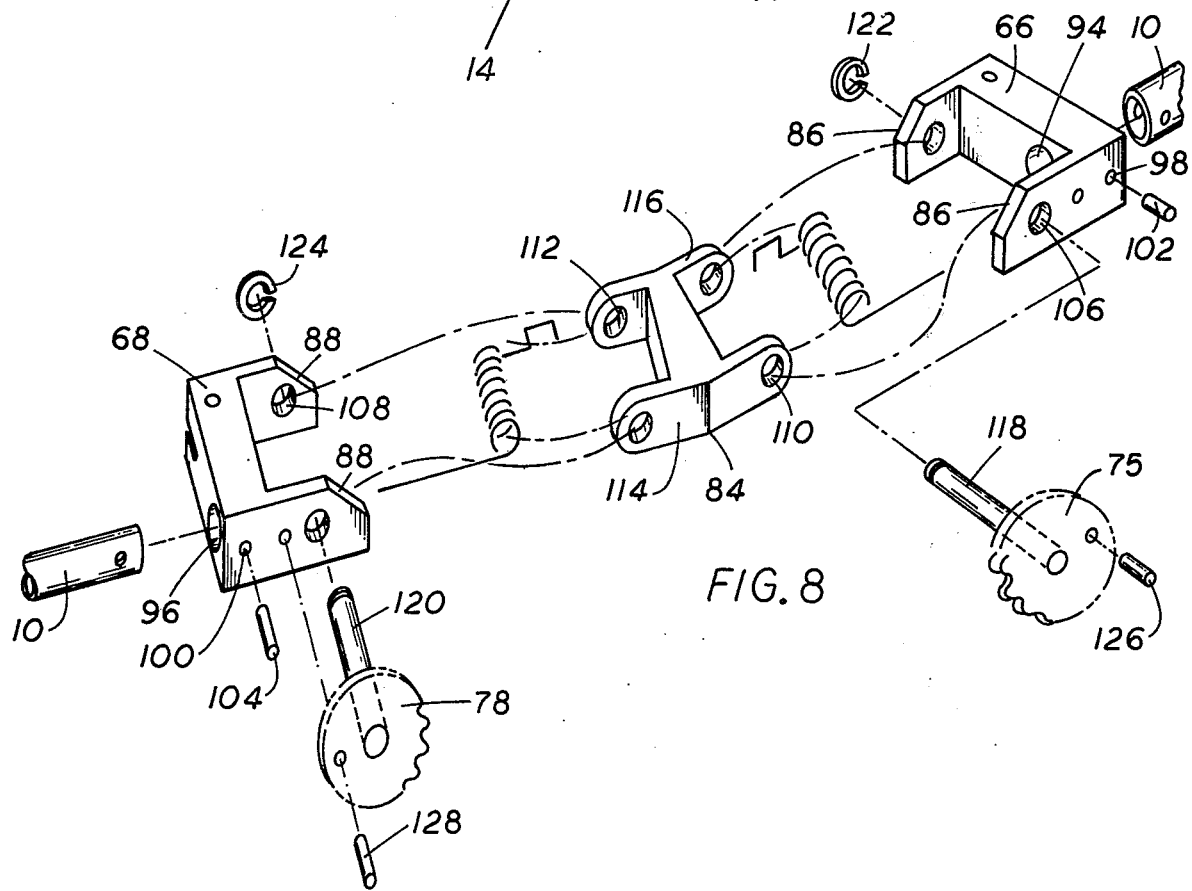
FIG. 8 is an exploded view of the elements for the articulated structure of FIG. 7.

As can be seen more particularly by FIGS. 7 and 8 the portions 66 and 68 have beveled surfaces 86 and 88 to permit the upward collapse of tubes 10. As shown in phantom in FIG. 6, similar surfaces 90 and 92 are used with regard to downward collapse of tubes 10 about blocks 12.

Actually a preferred construction of the articulation of tubes 10 is best shown in FIG. 8 with reference to block 14 which is similar in every way but direction of bevel of surfaces 86 and 88 to block 12.

More particularly there is shown by FIG. 8 that portions 66 and 68 are drilled as at 94 and 96, respectively to accept tubes 10. A cross bore 98 and 100 is drilled for pins 102 and 104 to hold tubes 10 to portions 66 and 68.

Portions 66 and 68 have their bifurcated ends bored as at 106 and 108 to mate with bores 110 and 112 through angled bifurcated sides 114 and 116 of bracket 84 so that shafts 118 and 120 may join portions 66 and 68 to bracket 84 while permitting the portions to collapse upwardly. Lock rings 122 and 124 hold shafts 118 and 120 in bores 106, 110 and 108, 112. Pins 126 and 128 mate gear sectors 75 and 78 to portions 66 and 68.

Figure 9:
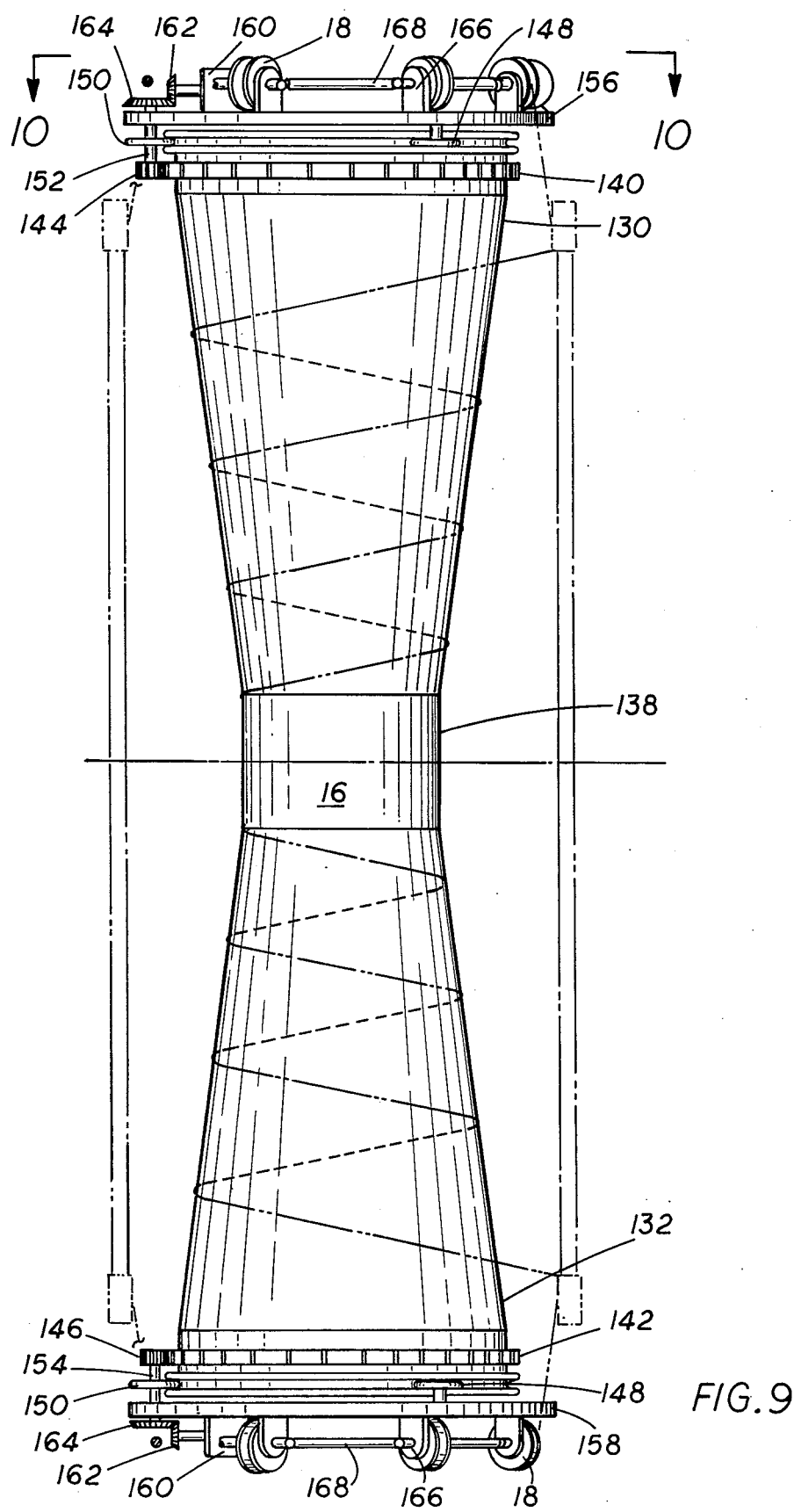
FIG. 9 is a side view of the hub of the deployable structure showing in phantom the rim segments and the gore elements and spokes as located thereabout in their stowed attitude.

As seen in FIG. 9 the hub 16 is designed to have a pair of truncated cones 130 and 132 on either side of a cylindrical surface 138. At the top and bottom the hub has ring gears 140 and 142 with which gears 144 and 146 mate to rotate the hub about its axis for unreeling and reeling gores (panels) therefrom and thereto whose alignment during reeling, unreeling is controlled by the angle of the surfaces of cones 130 and 132.

To the top and bottom of hub 16 there is supported, as by rollers 148 and 150, the latter being on shafts 152 and 154 for gears 144 and 146, plates 156 and 158. With such support, plates 156 and 158 may rotate with and relative to hub 16. On plates 156 and 158 are mounted motors 160 driving via gears 162 and 164 shafts 152 and 154 to thereby impart rotation to hub 16.

Figure 10:
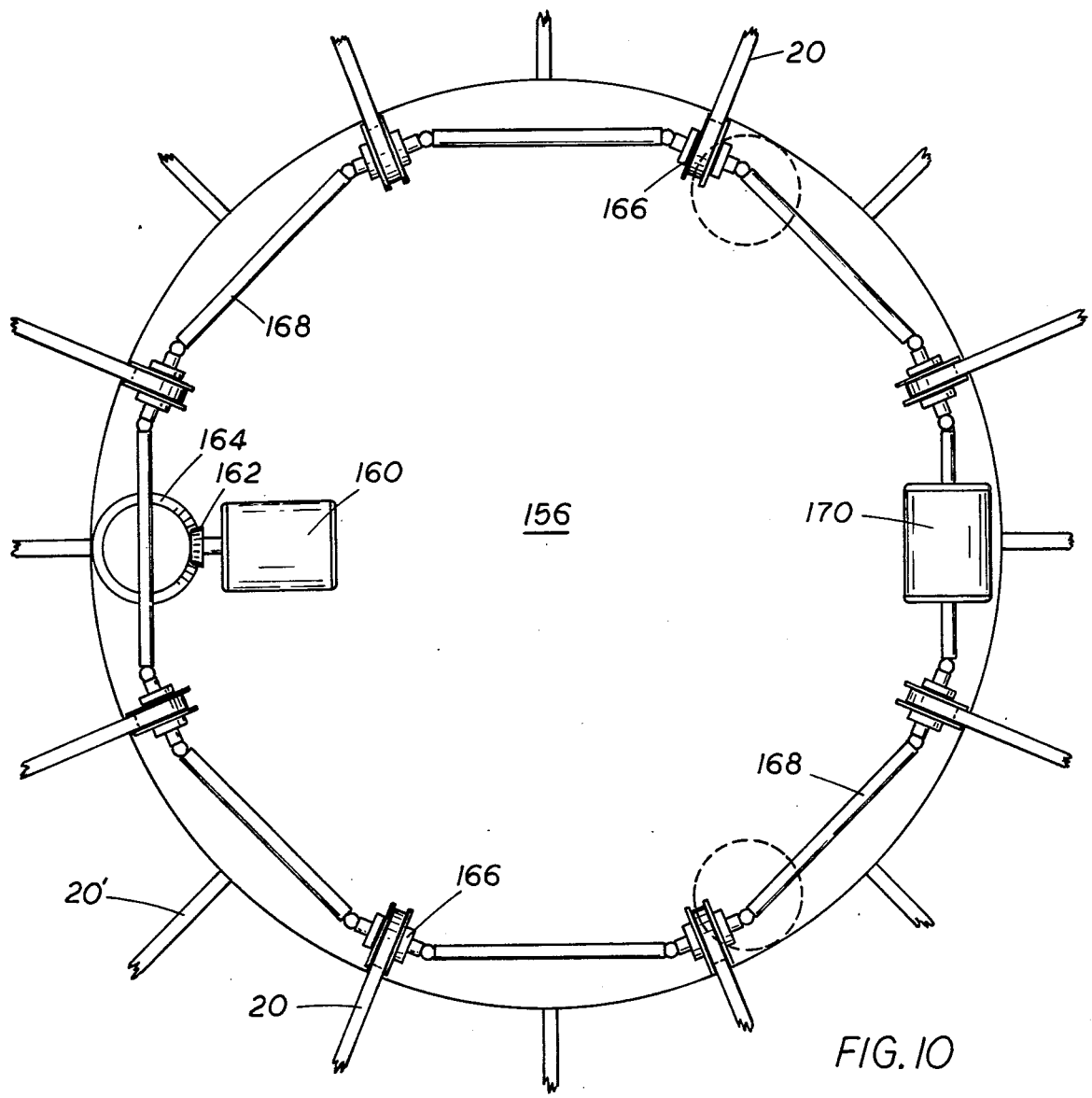
FIG. 10 is a view along lines 10—10 of FIG. 9.

In conclusion with regard to FIG. 9 the reels 18 are more clearly shown to be mounted by brackets 166 and connected by short shafts 168. This is better shown by FIG. 10 where there is also shown a motor 170 connected to the short shafts 168 that will present a magnetic drag on deployment of spokes 20 from plate 156 or spokes 20' from plate 158.

The deployable spoked-wheel structure is a feasible and practicable concept, and has excellent potential for deploying large-area equipment that must be structurally manageable. Further investigation has shown this invention may be used in such applications as antennas, reflectors and other equipment requiring the deployment of very large surface areas.

Figure 11:
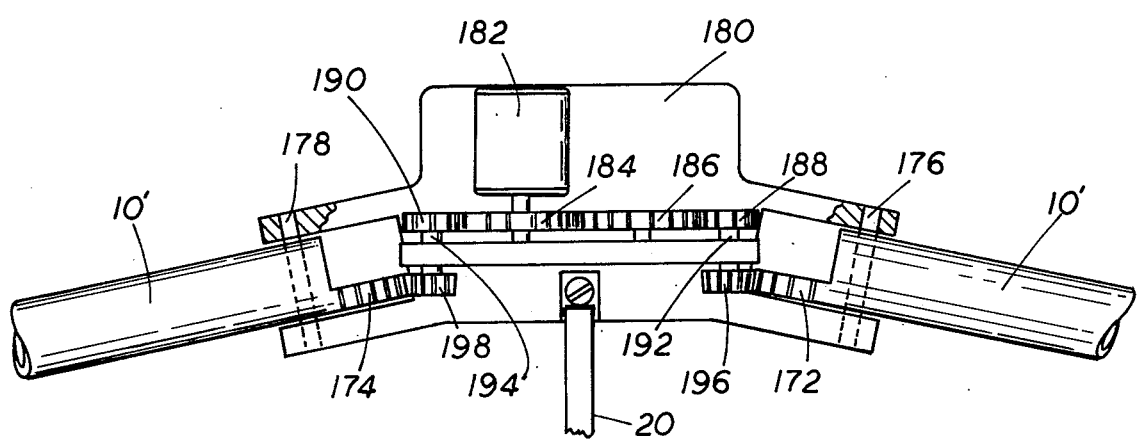
FIG. 11 is a plan view of an alternative arrangement for motor powdered articulation for the rim segments.

An alternative form of articulation and driving of the rim segments 10' is shown by FIG. 11. Here segments 10' are provided with gear sector extensions 172 and 174 and are mounted by pins 176 and 178 to a one piece block 180. A motor 182 is mounted on block 180 to drive a gear 184 that, through an idler gear 186, drives gears 188 and 190 connected by shafts 192 and 194 to gears 196 and 198 to rotate segments 10' about pins 176 and 178 via the connection of gears 196 and 198 with sectors 172 and 174, respectively.

The main text has described the design and deployment kinematics for the segmented rim of a spoked wheel designed to have two hinges per joint between rim segments. However, it is also kinematically possible to deploy a segmented rim which has only one hinge per joint. It is not intended, therefore that this application be solely limited to the two designs shown as others could well come within the concept disclosed.

Having described an operative construction by the manner of assembly and the requirements thereof, it is now desired to set forth the protection sought by these letters patent, as follows:

We claim:
1. A process of deploying a structure to be a support for large surface devices, said process comprised of the steps:

unfolding a plurality of rim segments that are hinged to each other by means so as to permit mid span rotation and outward translation of each rim segment;

deploying spoke means between opposite ends of a central hub member to said rim segments to controllably limit said outward translation; and removing panels from the central hub by the mid span rotation and outward translation to orient said panels to be the large surface device between the hub and the rim segments.

2. A deployable structure comprising:

a central hub;

a plurality of rim segments about said hub;

means to connect said rim segments together so as to be stowable as a cylindrical surface about said hub and deployable to a rim in a plane intermediate to the ends of the hub;

gores connected to said hub and to said rim segments to be unrolled from said hub as said rim segments are deployed to their rim attitude; and flexible means deployble from said hub to said rim segments at their connections one with the other, said flexible means being spokes acting in tension to stiffen said rim and hold its position in a horizontal plane of said hub.

3. The structure of claim 1 and further characterized by said means to connect being inclusive of means to cause deployment of said rim segments.

4. The structure of claim 3 wherein said means to cause deployment is torsion springs.

5. The structure of claim 3 wherein said means to cause deployment is a motorized gear means.

6. The structure of claim 2 wherein said hub is characterized as having surfaces formed by a pair of truncated cones joined by a cylindrical surface between small ends thereof which surfaces are rotatable to roll and unroll said gores by edge contact thereof with said surfaces.

7. A lightweight structure that is capable of being deployed from a compact profile to a large stable structure comprising:

a multiplicity of rim segments hinged together so as to be pivotable about an axis intermediate their ends;

a drum centrally located from said rim segments thereabout, said drum being revolvable relative to end plates thereof;

tension spoke means deployable from said end plates as said rim segments to which they are attached pivot; and payload surfaces rolled about said drum and connected to said rim segments to be deployed, unrolled, in a flat attitude from said drum as said rim segments pivot.

8. The structure of claim 7 and further characterized by said rim segments being hinged via spring biased portions of blocks that are synchronized by gear means.

9. The structure of claim 7 wherein the forces of the spring biased portions are metered by motor means on said end plates controlling pay-out of said tension spoke means.

10. The structure of claim 9 wherein the end plates support motor means controlling the rotation relative to the end plate of the drum.

* * * * *

UNITED STATES PATENT AND TRADEMARK OFFICE
CERTIFICATE OF CORRECTION

PATENT NO. : 4,030,102

DATED : June 14, 1977

INVENTOR(S) : Richard Kaplan and Jack L. Schultz

It is certified that error appears in the above-identified patent and that said Letters Patent are hereby corrected as shown below:

Col 2, Line 67: Delete "21" and insert therefor ---12---.

Col 3, Line 43: Delete "the" second occurrence and insert therefor ---about---

Col 5, Line 27: Delete "1" and insert therefor ---2---.

Signed and Sealed this

Eleventh Day of October 1977

[SEAL]

Attest:

RUTH C. MASON
*Attesting Officer*

LUTRELLE F. PARKER
*Acting Commissioner of Patents and Trademarks*